(12) United States Patent
Proserpio

(10) Patent No.: US 6,823,624 B2
(45) Date of Patent: Nov. 30, 2004

(54) PLASTIC ARTICLE WITH PROTUBERANCE

(75) Inventor: Carlo Proserpio, Merone (IT)

(73) Assignee: S.I.T., Inc., Quincy, MA (US)

( * ) Notice: Subject to any disclaimer, the term of this patent is extended or adjusted under 35 U.S.C. 154(b) by 0 days.

(21) Appl. No.: 10/062,303

(22) Filed: Feb. 1, 2002

(65) Prior Publication Data

US 2003/0014912 A1 Jan. 23, 2003

(30) Foreign Application Priority Data

Jul. 17, 2001 (IT) .......................................... MI01A1522
Oct. 4, 2001 (EP) ............................................. 01123740

(51) Int. Cl.$^7$ ............................ B29C 45/16; A01G 9/02
(52) U.S. Cl. ........................ 47/65.5; 264/255; 220/659
(58) Field of Search .......................... 264/255; 47/65.5, 47/66.1; 220/659

(56) References Cited

U.S. PATENT DOCUMENTS

| | | | | |
|---|---|---|---|---|
| 3,420,729 A | * | 1/1969 | Roberts | 428/35.7 |
| 3,545,645 A | * | 12/1970 | Smith | 220/658 |
| 3,547,747 A | * | 12/1970 | Roberts | 428/339 |
| 3,804,331 A | * | 4/1974 | Levey | 239/59 |
| 3,956,441 A | | 5/1976 | Uhlig | 264/86 |
| 4,115,506 A | * | 9/1978 | Shima | 264/250 |
| 4,398,785 A | | 8/1983 | Hedrick | 339/196 R |
| 5,089,200 A | * | 2/1992 | Chapman et al. | 264/127 |
| 5,464,578 A | | 11/1995 | Salter et al. | 264/250 |
| 5,515,092 A | | 5/1996 | Swanson et al. | 347/87 |
| 5,599,598 A | * | 2/1997 | Valyi | 428/35.7 |
| 5,640,186 A | | 6/1997 | Swanson et al. | 347/86 |
| 5,765,922 A | * | 6/1998 | Hsia | 297/440.1 |
| 5,894,041 A | * | 4/1999 | Cornell | 428/35.7 |
| 5,954,223 A | | 9/1999 | Moore | 220/659 |
| 6,033,610 A | | 3/2000 | Swanson et al. | 264/250 |
| 6,071,454 A | * | 6/2000 | Shimizu et al. | 264/250 |
| 6,213,897 B1 | * | 4/2001 | Masutani | 473/378 |
| 6,217,818 B1 | | 4/2001 | Collette et al. | 264/513 |
| 2003/0014912 A1 | * | 1/2003 | Proserpio | 47/65.5 |
| 2003/0051399 A1 | * | 3/2003 | Scrralunga | 47/65.5 |

FOREIGN PATENT DOCUMENTS

| | | | | |
|---|---|---|---|---|
| EP | 0733462 A1 | * | 9/1996 | |
| EP | 1277556 A1 | * | 1/2003 | ........... B29C/45/16 |
| FR | 2 340 193 | | 9/1977 | ............. B29F/1/12 |
| FR | 2 733 715 | | 11/1996 | ........... B29C/69/02 |
| GB | 2173984 A | * | 10/1986 | |
| JP | 4-301419 | * | 10/1992 | ........... B29C/45/14 |
| WO | WO 97/13631 | * | 4/1997 | ........... B29C/45/16 |
| WO | WO 99/20462 | | 4/1999 | ........... B32B/27/00 |

OTHER PUBLICATIONS

"Progarden Group," catalog (2001).
"Serralunga1825, The Italian Style Plastic Flower Pots, Collection '01,", P. Serralunga s.r.l., Italy (2001).

* cited by examiner

*Primary Examiner*—Jack Keith
*Assistant Examiner*—Jeffrey L. Gellner
(74) *Attorney, Agent, or Firm*—Hamilton, Brook, Smith & Reynolds, P.C.

(57) ABSTRACT

A plastic article includes a first plastic portion having a series of protrusions extending therefrom and adjacent to each other. A second plastic portion is molded between and over the protrusions of the first plastic portion, thereby forming a protuberance on the plastic article in a desired profile.

13 Claims, 9 Drawing Sheets

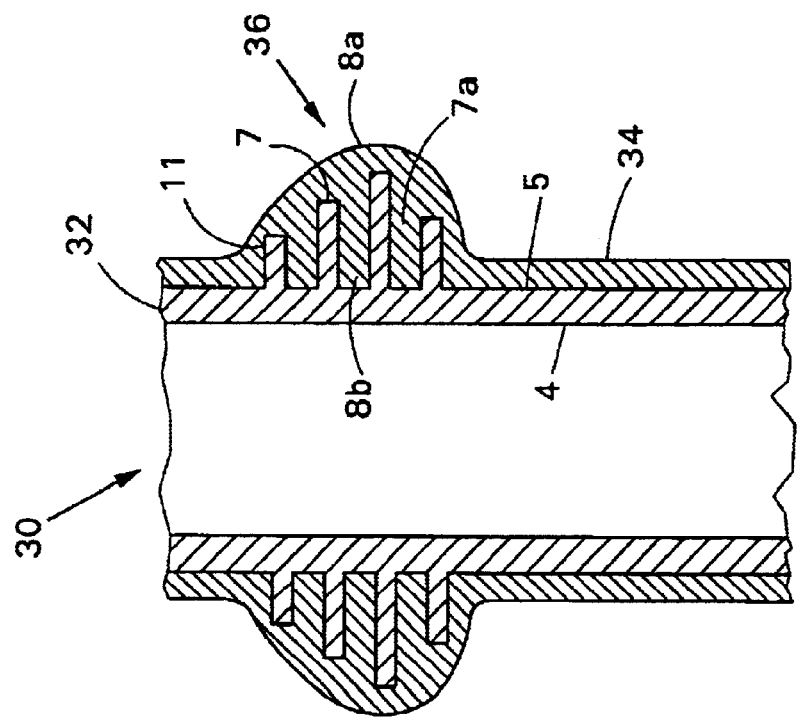
FIG. 11
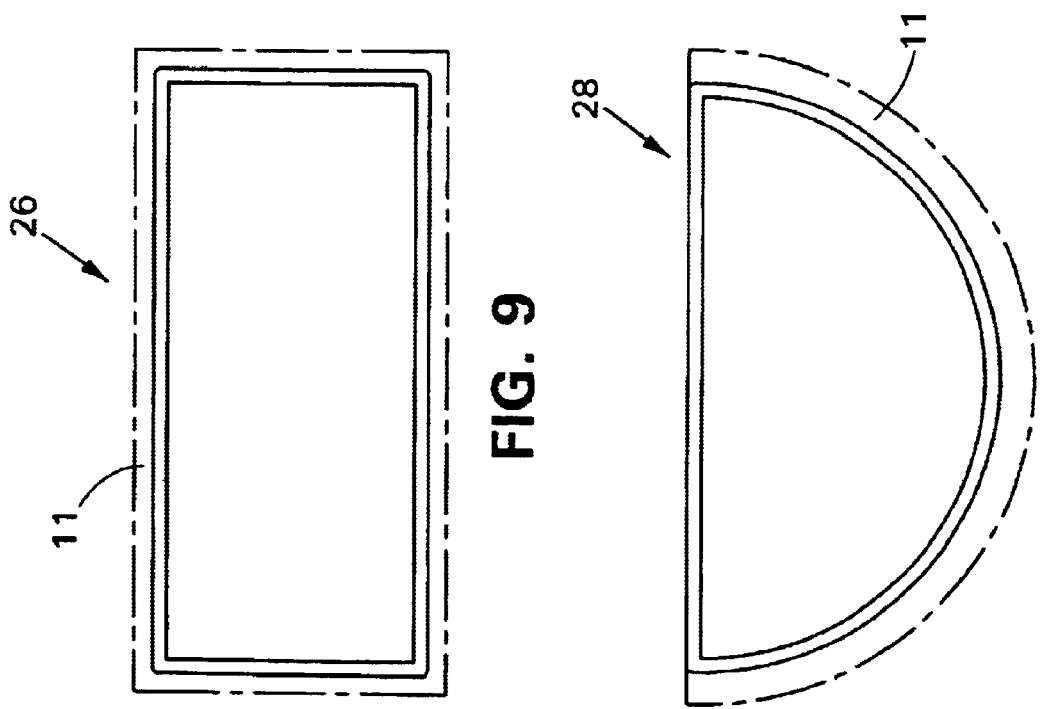
FIG. 9
FIG. 10

US 6,823,624 B2

PLASTIC ARTICLE WITH PROTUBERANCE

RELATED APPLICATIONS

This application claims priority under 35 U.S.C. § 119 or 365 to European Application No. 01123740.1, filed Oct. 4, 2001, and Italian Application No. MI2001A 001522, filed Jul. 17, 2001, entitled "Method for Producing, by Injection Moulding, a Plastic Body Provided with Localized Protuberances", by Carlo Proserpio. The entire teachings of the above applications are incorporated herein by reference.

BACKGROUND

Most plastic pots such as for displaying flowers or other plants are currently formed by either rotomolding or injection molding. The pots that are rotomolded can be made to have the appearance of terra cotta pots, including having an end collar with a realistic looking thickened rim. A drawback of rotomolding is that it is a slow manufacturing process. As a result, pots made with such a process are relatively expensive. Injection molded pots are manufactured more quickly in comparison to rotomolded pots and are less expensive. However, current injection molded pots do not have the realistic appearance of terra cotta pots. One reason is that the rims of injection molded pots are typically formed by folding or bending the end collar wall outwardly, resulting in an overhanging lip.

SUMMARY

Thickened rims for pots have not been injection molded because such rims would have to be solid, and therefore, take too long to cool while in the mold, especially in the large pot sizes. Embodiments of the present invention include a plastic article having a thickened protuberance that can be injection molded relatively quickly. In some embodiments, the thickened protuberance can be a thickened rim on a flower pot. A particular plastic article includes a first plastic portion having a series of protrusions extending therefrom adjacent to each other. A second plastic portion is molded between and over the protrusions of the first plastic portion, forming a protuberance on the plastic article having a desired profile.

In particular embodiments, the protrusions extending from the first plastic portion can be contoured to provide a general approximation of the desired profile of the protuberance. The protrusions each have a height and a thickness, with the height being greater than the thickness. In some embodiments, the plastic article is a container where the first plastic portion is an inner container portion and the second plastic portion is an outer container portion molded over the inner container portion. The inner container portion can include an inner pattern formed thereon for supporting a corresponding outer pattern on the outer container portion. The protuberance can form an upper rim of the container. In other embodiments, the container is a flower pot. The protrusions of the flower pot can be one of horizontal fins, vertical fins, or fins with a zigzag pattern, and the inner container portion can have a fluted side wall. In still other embodiments, the protuberance is on one of a chair and a table.

Particular embodiments can be a flower pot including a plastic inner pot portion having an opening with a series of protrusions extending outwardly therefrom adjacent to each other. A plastic outer pot portion can then be molded over the inner pot portion. The outer pot portion can extend between and over the protrusions of the inner pot portion to form a protruding peripheral rim of a desired profile.

In particular embodiments, the inner pot portion can be formed by injection molding in a first mold configuration. The outer pot portion can then be molded over the inner pot portion by injection molding in a second mold configuration.

Particular methods of manufacture can include a method of forming a plastic article including providing a first plastic portion having a series of protrusions extending therefrom adjacent to each other. A second plastic portion can then be molded between and over the protrusions of the first plastic portion to form a protuberance on the plastic article of a desired profile.

In particular embodiments, the first plastic portion can be formed by injection molding in a first mold configuration. The second plastic portion can then be formed by injection molding over the first plastic portion in a second mold configuration. The first plastic portion can be provided with mineral fillers for reducing the cooling time of the first plastic portion.

Plastic articles with thickened protuberances can be injection molded which in the prior art was not commercially feasible. This includes flower pots having a deep tapered double wall construction and thickened end collar rim. Such flower pots not only can have a realistic appearance of terra cotta (or other traditional) pots but can also be manufactured faster and more cheaply than prior art methods.

BRIEF DESCRIPTION OF THE DRAWINGS

The foregoing and other objects, features and advantages of the invention will be apparent from the following more particular description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 9 is a plan view of yet another embodiment of an inner pot portion for a flower pot.

FIG. 10 is a plan view of still another embodiment of an inner pot portion for a flower pot.

FIG. 11 is a side sectional view of a portion of a column structure having a protuberance.

DETAILED DESCRIPTION

Figure 1:
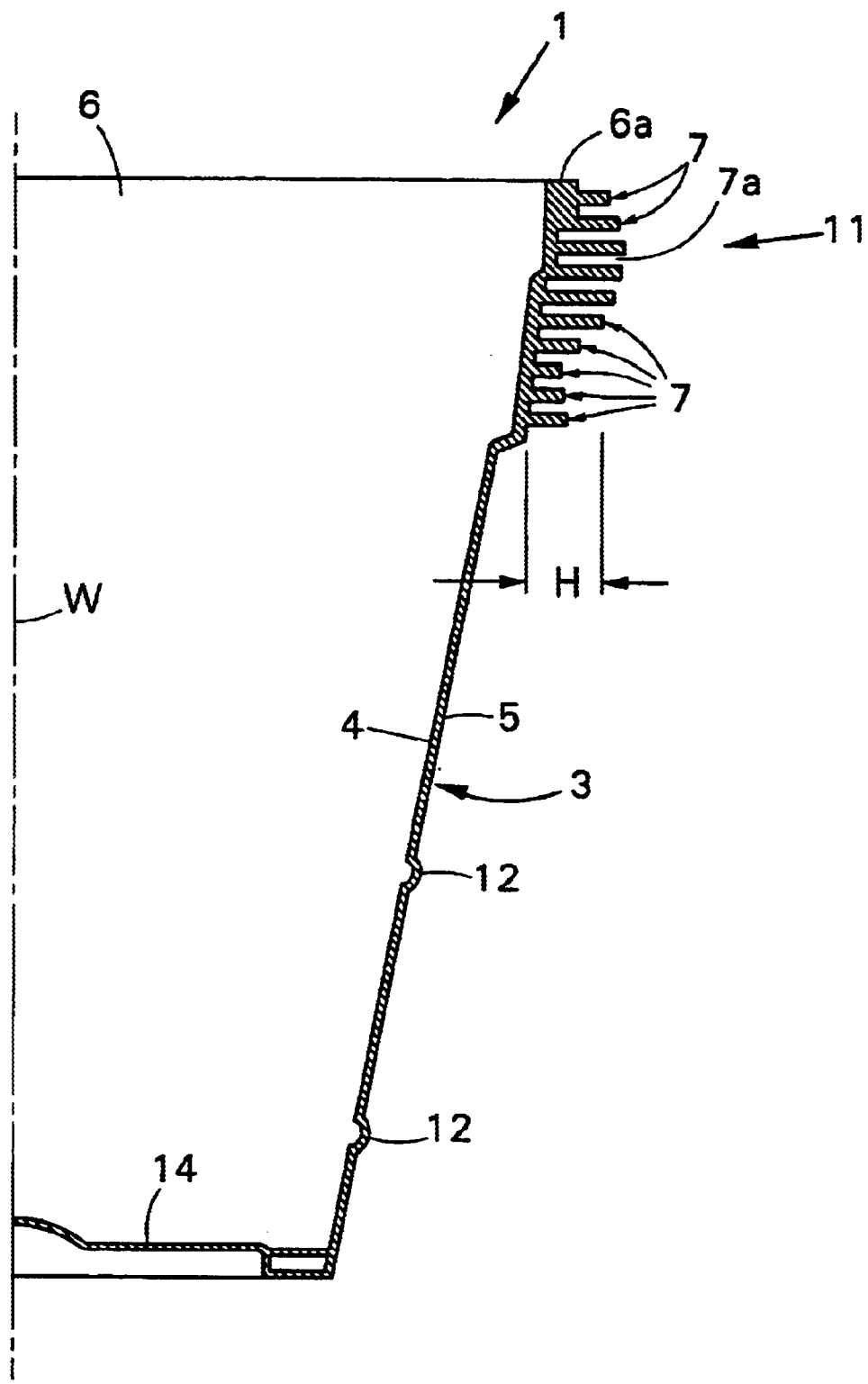
FIG. 1 is a half side sectional view of an inner pot portion for a flower pot in one embodiment of the present invention.
Figure 2:
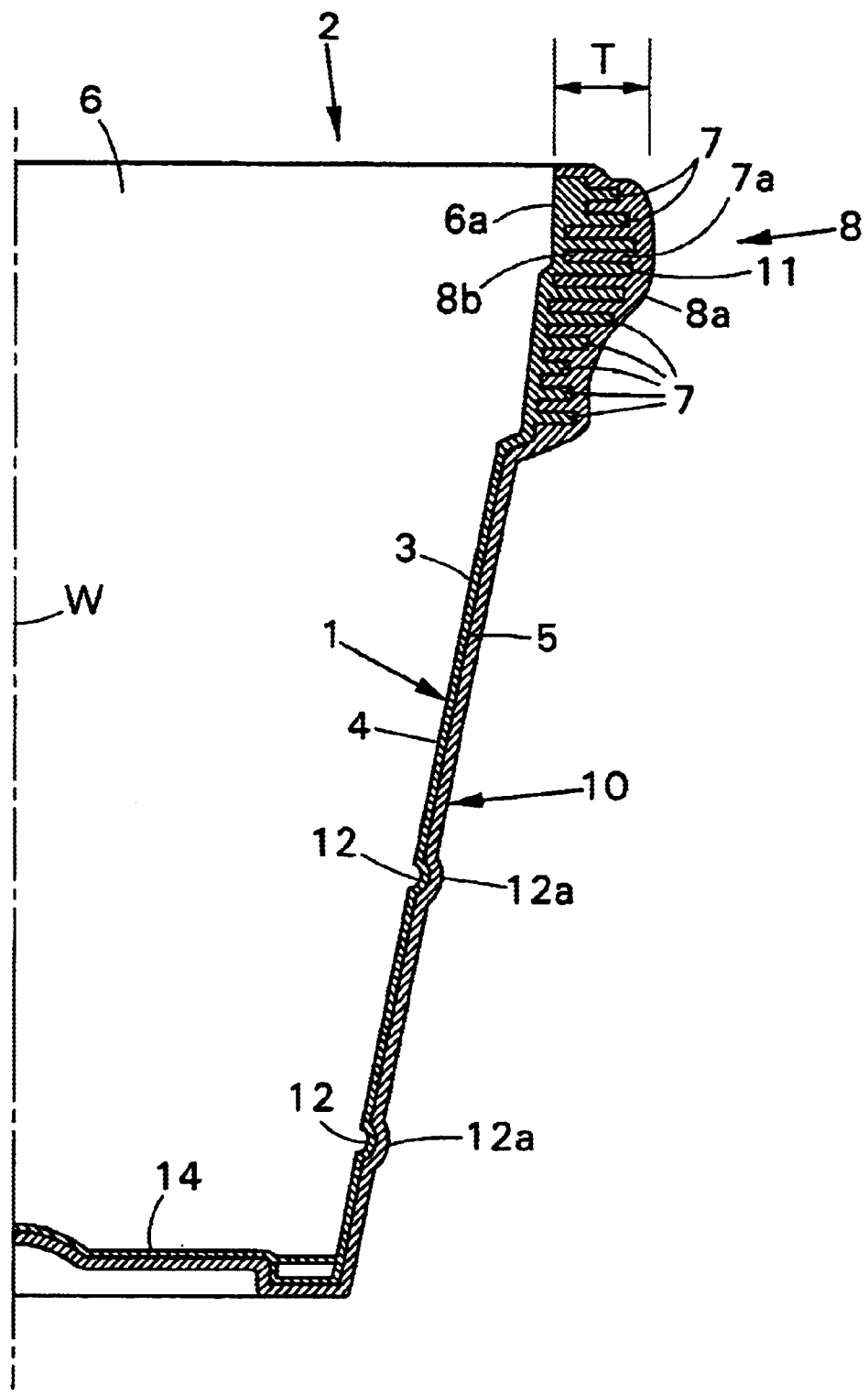
FIG. 2 is a half side sectional view of an outer pot portion molded over the inner pot portion to form a flower pot.
Figure 3:
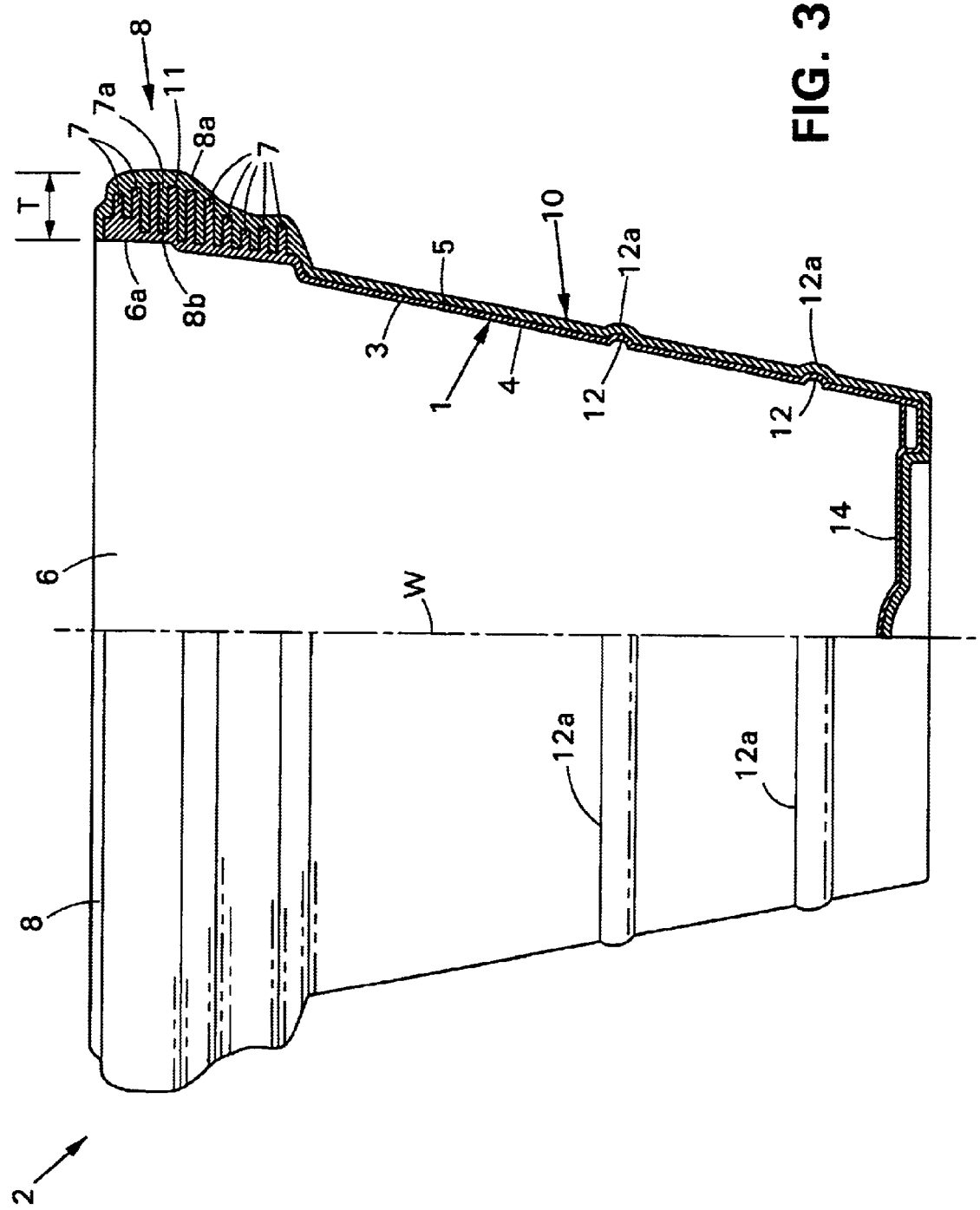
FIG. 3 is a side view of the flower pot of FIG. 2 with half of the flower pot shown in section.

Referring to FIGS. 1–3, container or flower pot 2 is a plastic article in accordance with the present invention having a plastic inner pot portion 1 and a plastic outer pot portion 10 molded over the inner pot portion 1 to clad the inner pot portion 1 and form a double wall construction. Referring to FIG. 1, inner pot portion 1 has a side wall 3 with an inner surface 4 and an outer surface 5. The inner pot portion 1 has a protrusion or fin structure 11 extending or projecting outwardly from the regions 6a surrounding the opening 6 into inner pot portion 1. Fin structure 11 includes a series of horizontally oriented flat or planar annular fins 7 that are perpendicular to the central axis W of inner pot portion 1. The bottom 14 of inner pot portion 1 can have indented and/or protruding portions as needed. Referring to FIGS. 2 and 3, outer pot portion 10 extends around the inner pot portion 1 under bottom 14 and over the outer surface 5 of side wall 3. Outer pot portion 10 also extends within the spaces 7a between the fins 7 of the fin structure 11 as well as over the fins 7, thereby forming a localized thickened annular protuberance or peripheral end collar rim 8. The opening 6 into inner pot portion 1 becomes the opening into the finished flower pot 2. The side wall 3 of inner pot portion 1 can have one or more designs or patterns 12 formed therein which support a corresponding design or pattern 12a formed on the outer pot portion 12.

The fin structure 11 with the fins 7 allows a large flower pot 2 to be injection molded in a commercially viable manner while at the same time having a thickened peripheral rim 8 at the upper edge that has the appearance of a rim on a terra cotta pot. If the thickened peripheral rim 8 were to be molded in a single injection molding process with the thickness T (FIGS. 2 and 3) being of the magnitude shown, the rim 8 would contain too great a volume of molten plastic to be able to cool properly or quickly enough for viable manufacturing in such a manner.

The fin structure 11 is made with a series of protruding or projecting fins 7, which, although can have a relatively large height H (FIG. 1), are spaced apart from each other and are sufficiently thin to experience sufficient cooling and hardening at a rate fast enough for an injection molding process. The fins 7 provide a high surface area to thickness ratio which allows rapid cooling and eliminate the existence of a large thick volume of molten plastic which inherently has a low surface area to thickness ratio and cools slowly. The series of fins 7 can radiate heat from the molded inner pot portion 1 and provide cooling in a manner similar to a radiator. The fin structure 11 forms approximately half the structure and material for the rim 8. When the outer pot portion 10 is molded over the inner pot portion 1, an outer layer of plastic 8a covers the fin structure 11 as well as occupying or penetrating the spaces 7a between the fins 7 as inwardly directed interlocking fins 8b. In other words, the plastic material of the outer pot portion 10 extends between and over the fins 7 of the fin structure 11 so that the combination of the fins 7 of fin structure 11 and the plastic of outer portion 10 combine to form a unitary protuberance 8. The second molding process in the area of the rim 8 molds plastic material in a form that is approximately the reverse of the fin structure 11. Therefore, the inwardly directed fins 8b and the outer layer 8a of the outer pot portion are in a configuration for having a sufficient cooling speed in the second injection molding process. By forming the rim 8 in two molding processes, the amount and thickness of molten plastic that needs to cool at a particular moment is limited so that cooling can occur in an acceptable amount of time. In addition, forming the walls of the flower pot 2 in two operations can benefit in the same manner. The fins 7 in the fin structure 11 can be configured to approximate the desired profile of the rim 8 as seen in FIGS. 2 and 3.

If desired, the flower pot 2 can have patterns or designs 12a on the exterior surface. In the embodiment shown in FIGS. 2 and 3, the designs 12a are raised annular ridges. In other embodiments, the patterns or designs 12a can be other suitable raised or indented geometrical designs, as well as raised or indented representations of people, animals, or plants including fruits, leaves, flowers, trees, etc. When a pattern or design 12a on the exterior surface is desired, the inner pot portion 1 is formed with raised and/or indented regions having a design 12 that represents or approximates the final outer design 12a. The design 12 on the inner pot portion 1 provides support for the outer design 12a during molding of the outer pot portion 12 by serving as a mold surface.

In one embodiment of the present invention, flower pot 2 can be about 17 inches in diameter, 15½ inches high, and have a rim 8 that is about 1½ inches thick and 4 inches high. The side wall 3 of the inner pot portion 1 can be about 0.1 inches thick with the outer pot portion 10 being about 0.05 inches thick. The height H of the fins 7 may vary but are typically greater than the thickness of fins 7. Usually, the fins 7 are spaced apart from each other by a distance that is about the thickness of a fin 7. As seen in FIGS. 2 and 3, rim 8 can include curves, angles, recessed areas, etc. It is understood that the dimensions of flower pot 2 can vary greatly depending upon the size and design desired.

Figure 4:
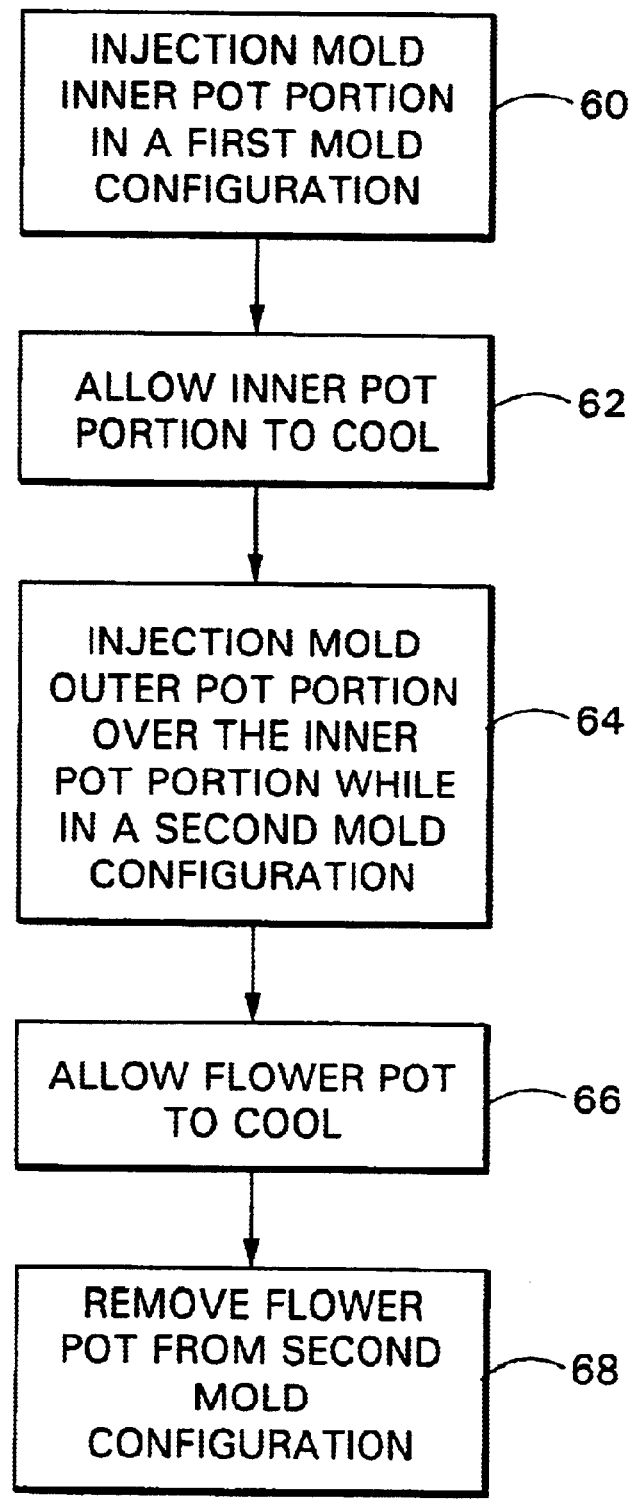
FIG. 4 is a flow chart depicting steps of a method of manufacturing a flower pot in the present invention.

FIG. 4 depicts the steps of a method of manufacturing flower pot 2. In step 60, the inner pot portion 1 is injection molded by the injection of thermoplastic material into a first mold configuration. The first mold configuration includes an inner mold portion and a first outer mold portion. The inner pot portion 1 is cooled in step 62 while still in the first mold configuration until sufficiently hardened for a second molding process. In some embodiments, the inner pot portion 1 is formed of a thermoplastic material containing a mineral filler, for example, calcium carbonate, for adding to the structural integrity as well as reducing the cooling time. Once the inner pot option 1 has sufficiently cooled, the first outer mold portion is replaced with a second outer mold portion that surrounds the inner pot portion 1 with the inner mold portion remaining within the inner pot portion 1, thereby forming a second mold configuration. In step 64, outer pot portion 10 is molded over the inner pot portion 1 by injecting thermoplastic material over the inner pot portion 1 while the inner pot portion 1 is in the second mold configuration, thereby forming the flower pot 2. Surfaces of the inner pot portion 1 can serve as molding surfaces. The fins 7 of fin structure 11 combine with the fins 8b and outer layer 8a of outer pot portion 10 to form thickened rim 8. The flower pot 2 is cooled in step 66 and then removed from the second mold configuration in step 68. In one embodiment, the molding process includes a rotary table machine. In such an embodiment, the rotary table machine moves an inner mold portion 180° between a first outer mold portion and a second outer mold portion. As a result, after the inner pot portion 1 is molded within the first outer mold portion, the inner pot portion 1 is moved 180° with the inner mold portion by the rotary table for positioning within the second outer mold portion. Typically, the rotary table machine has two inner mold portions that are 180° apart so that production can be maximized. In some situations, the first and second outer mold portions can be positioned at other suitable angles relative to each other. In another embodiment, the inner mold portion and the inner pot portion 1 can be moved along a linear track. In other embodiments, first and second outer mold portions can be moved into position or formed around the inner pot portion 1 and/or the inner mold portion.

The time required to form flower pot 2 varies depending upon the size of the flower pot due to varying cooling and injection times. However, a flower pot 2 formed in the present invention can be made in about ¼ to ⅕ the time required to form the same sized flower pot by rotomolding. As a result, flower pot 2 can be manufactured with higher productivity for a given unit of time, and therefore, less expensively. In addition, the injection molding processes allow flower pot 2 to have outer surfaces with a high level of finish.

Figure 5:
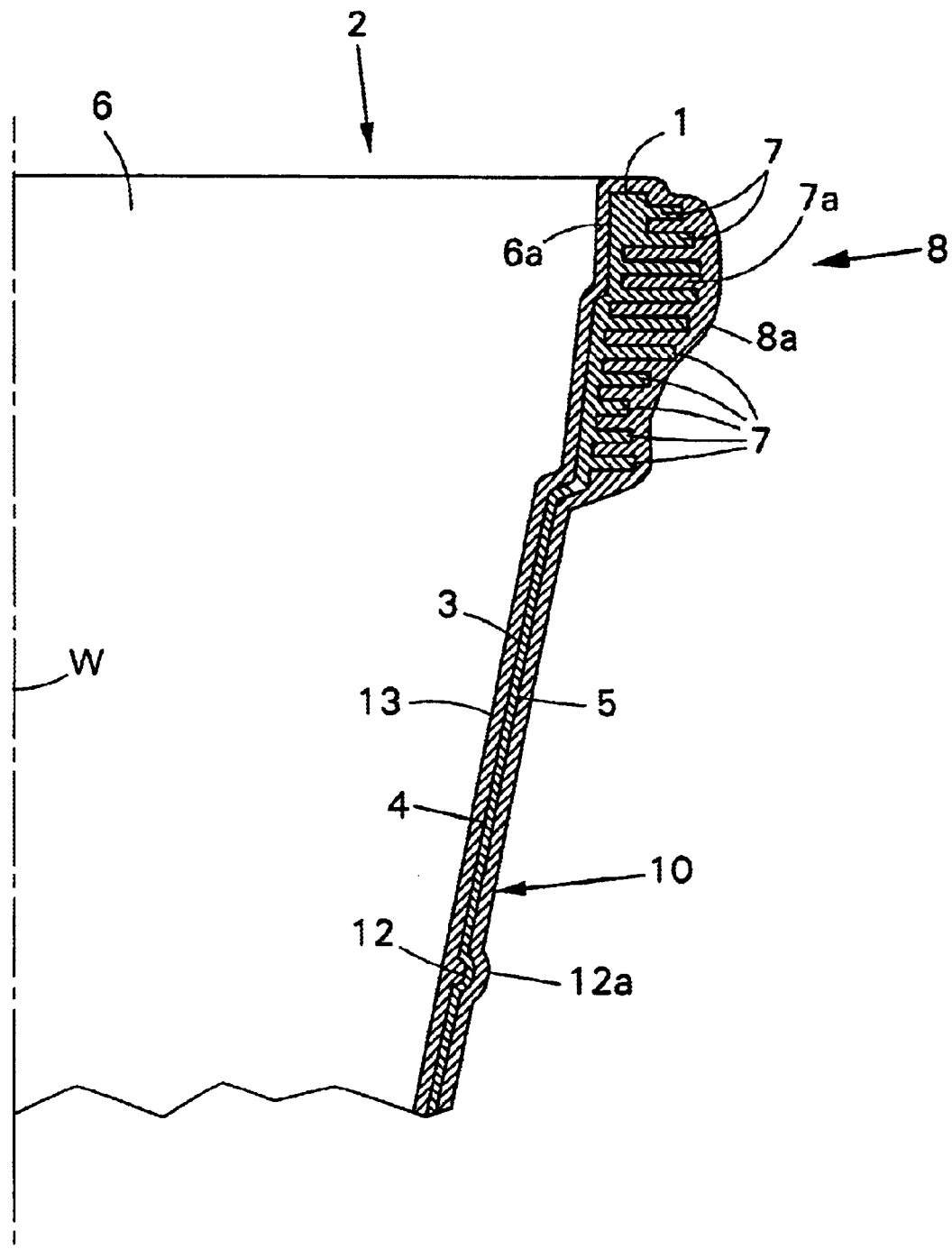
FIG. 5 is a half side sectional view of the upper portion of another embodiment of a flower pot.

Referring to FIG. 5, flower pot 2 can also be formed with an outer pot portion 10 that includes a layer 13 which covers the inner surface 4 of inner pot portion 1 and the inner surface of the bottom 14 (FIGS. 1–3). This may be desirable when the inner pot portion 1 is formed of a plastic that has a different color or physical properties than outer pot portion 10. In some instances, the layer 13 may extend only partway down the inner surface 4 of inner pot portion 1, for example, just below rim 8, since the flower pot 2 will presumably be filled with dirt. In one embodiment, layer 13 is formed in a third injection molding step.

Figure 6:
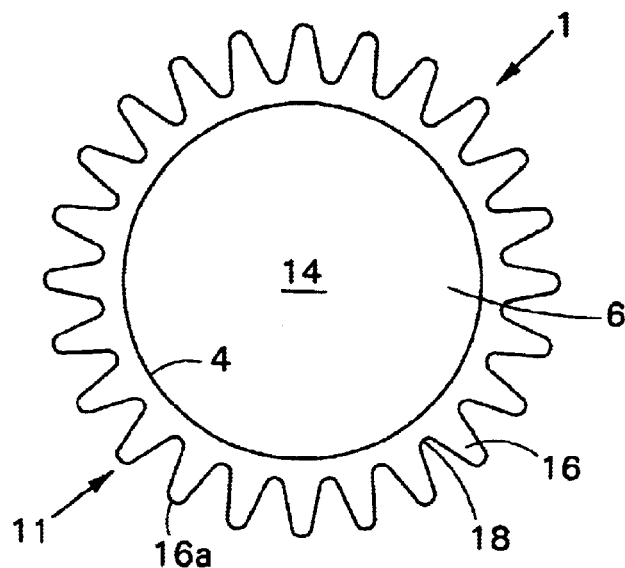
FIG. 6 is a top view of another embodiment of an inner pot portion for a flower pot.
Figure 7:
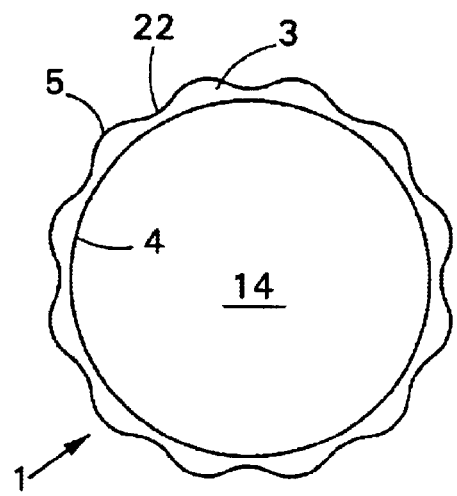
FIG. 7 is a cross sectional view through the inner pot portion of FIG. 6 below the fin structure.

Referring to FIG. 6, inner pot portion 1 can be formed with a fin structure 11 having vertical or upright protrusions or fins 16 extending radially outward adjacent to each other with spaces or gaps 18 therebetween in a spokelike fashion. In such a configuration, the outward surfaces or ends 16a of fins 16 can be shaped or contoured to approximate the profile of the rim 8. In addition, referring to FIG. 7, inner pot portion 1 can be formed with indents or flutes 22 in the outer surface of the sidewall 3. The flutes 22 can provide stiffness in a manner similar to corrugations while minimizing the amount of thermoplastic required to form sidewall 3.

Figure 8:
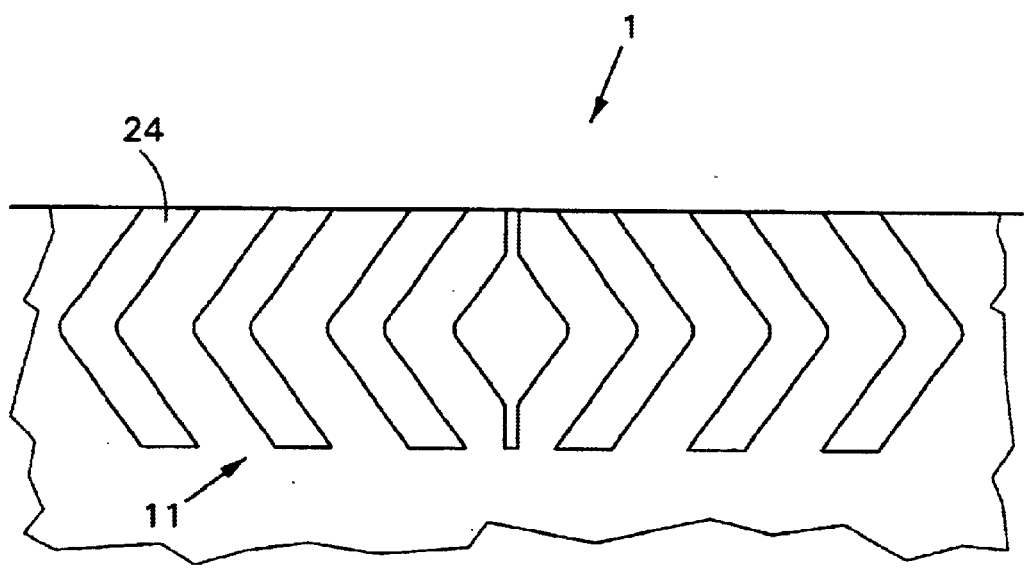
FIG. 8 is a side view of a portion of another embodiment of a fin structure on an inner pot portion for a flower pot for forming the rim.

Referring to FIG. 8, inner pot portion 1 can also have a fin structure 11 where the fins 24 are angled in a herring bone or zig zag pattern. In some situations, the fins 24 can be made to angle only in one direction or can be curved. In other embodiments, fin structure 11 can have annular planar fins that are angled either upwardly or downwardly.

FIG. 9 depicts an inner container or pot portion 26 in accordance with the present invention where the inner pot portion 26 is rectangular in shape for forming a rectangular container or flower pot when overmolded. The inner pot portion 26 includes a fin structure 11 for forming a thickened peripheral protuberance or rim 8. The fin structure 11 contains fins such as those discussed above. If desired, a fin structure 11 can also be positioned at other locations such as the bottom of inner pot portion 26 for forming a base. The rectangular shape of inner pot portion 26 can be of varying degrees of length and width, and in some cases may be square. In addition, the corners or ends of inner pot portion 26 can be rounded if desired.

FIG. 10 depicts an inner container or pot portion 28 in accordance with the present invention which is semicircular in shape for forming a semicircular container or flower pot when overmolded. The inner pot portion 28 includes a fin structure 11 extending in a semicircular configuration around the upper edge for forming a thickened semicircular peripheral protuberance or rim 8. A fin structure 11 can also be positioned at other locations as with inner pot portion 26. Although inner pot portion 28 is depicted to be semicircular, inner pot portion 28 can be formed to have arcs of other angular lengths, for example 270°, 90° etc. In addition, compound arc configurations can be employed. Consequently, it is understood that the flower pots and containers of the present invention can be of any geometrical shape or combination of shapes. In addition, the containers of the present invention can be any of a variety of decorative or storage items such as a bird bath, fountain, trash can, kitchenware, storage containers, etc.

FIG. 11 depicts a portion of a plastic article such as a hollow post or column 30 made in accordance with the present invention which includes a projecting protuberance 36. Column 30 can be formed in combination with a container, or can be a free standing structure. When column 30 is formed in combination with a container, the resulting article can be for example, a bird bath, fountain, flower pot, etc. In some embodiments, features such as a back splash or decorative walls and/or structures are included. Column 30 includes hollow inner portion 32 having a fin structure 11 with a series of peripheral 7 fins. Fin structure 11 can also have fins of other configurations as previously discussed. Outer portion 34 is molded over inner portion 32. The plastic material of outer portion 34 extends between fins 7 and fills the spaces 7a therebetween, and thereby forms inwardly directed interlocking fins 8b. A layer of plastic 8a covers the fin structure 11 in a desired profile. Outer portion 34 typically also covers or clads the outer surface 5 of inner portion 32. In some embodiments, outer portion 34 can be located in limited regions. The protuberance 36 can be positioned at the top, bottom or middle areas of column 30, or there can be multiple protuberances 36 at various locations. Column 30 can be round, rectangular, polygonal, or combinations thereof.

Figure 12:
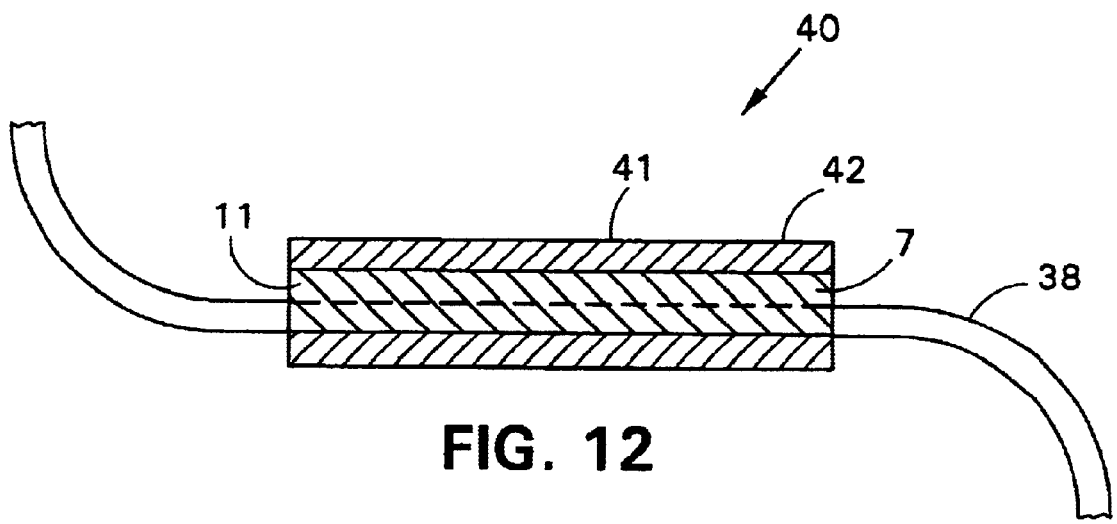
FIG. 12 is a side view of an arm of a chair having a protuberance with a portion of the protuberance being in section.
Figure 13:
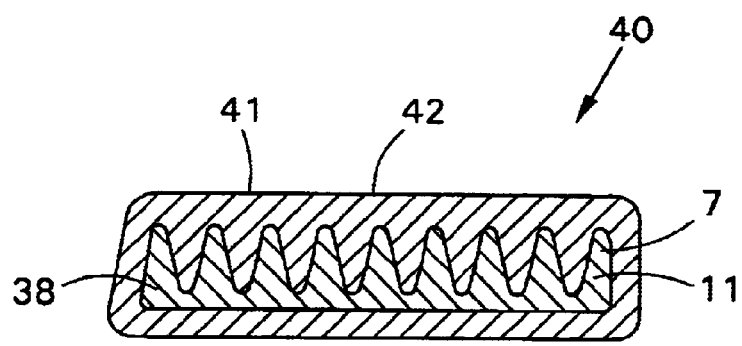
FIG. 13 is a cross sectional view of the protuberance depicted in FIG. 12.
Figure 14:
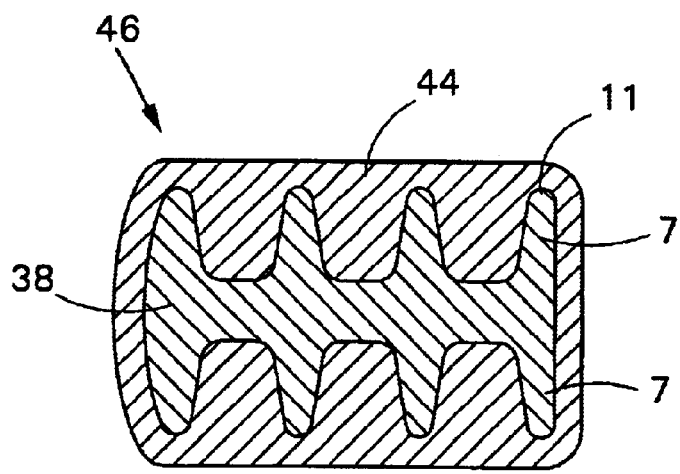
FIG. 14 is another embodiment of a protuberance on an arm of a chair.

FIG. 12 depicts a plastic article in accordance with the present invention such as an arm 40 of a plastic chair having a thickened portion or protuberance 41 thereon. FIG. 13 depicts the thickened portion 41 of the arm 40 in cross section. The arm 40 includes a furniture or arm structure 38 forming a first or inner plastic portion. The furniture structure 38 includes a fin structure 11 (FIG. 13) having a series of fins 7 extending vertically upwardly or perpendicularly upright therefrom. A second or outer plastic portion 42 is molded over the fin structure 11 to produce a thickened portion or protuberance 41 on the furniture structure 38. If desired, the second plastic portion 42 can be molded beyond the ends of the fin structure 11. Such a thickened portion 41 can also be formed on other portions of a plastic chair such as on the backrest, edges of the seat, legs, etc. In addition, thickened portion 41 can be formed on a plastic stool or a table, for example the legs or the edges of the stool or table top. FIG. 14 depicts another embodiment of a thickened portion or protuberance 46 which can be substituted for thickened portion 41. Thickened portion 46 includes a furniture structure 38 forming a first or inner plastic portion which has a fin structure 11 with fins 7 extending from two opposed sides of furniture structure 38. A second or outer plastic portion 44 is molded over the opposed fins 7 of the fin structure 11, thereby forming the thickened portion or protuberance 46.

Figure 15:
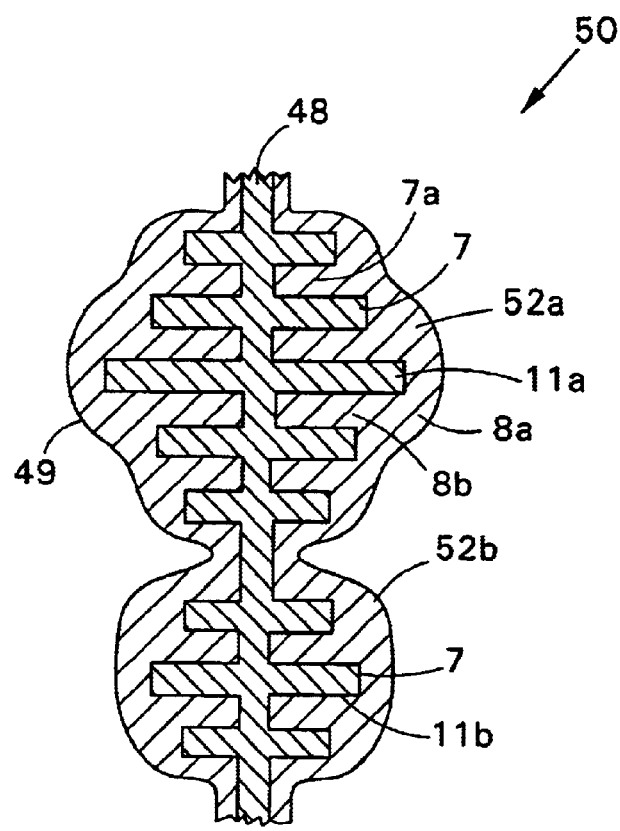
FIG. 15 is a side sectional view of another embodiment of a furniture member having protuberances.

FIG. 15 depicts portion of a plastic article in accordance with the present invention such as a solid plastic furniture structure 50 which is suitable for the legs, backrest, or supporting structural pieces of plastic furniture, such as chairs, stools, tables, etc. Furniture structure 50 includes a solid first or inner plastic portion 48 having a series of fin structures 11a, 11b, etc. with fins 7. The fin structures 11a, 11b, etc. can have fins of various configurations as previously discussed. A second or outer plastic portion 49 is molded over the inner plastic portion 48 and the fin structures 11a, 11b, etc., thereby forming protuberances 52a, 52b, etc. The protuberances 52a, 52b, etc. can be formed to have the appearance of wooden furniture members which have been turned on a lathe. In situations where the diameter or width of furniture structure 50 is large, the inner plastic portion 48 can be hollow, such as the inner portion 32 depicted in FIG. 11. Alternatively, in some instances, the column 30 depicted in FIG. 11 can have a solid inner plastic portion 48.

Figure 16:
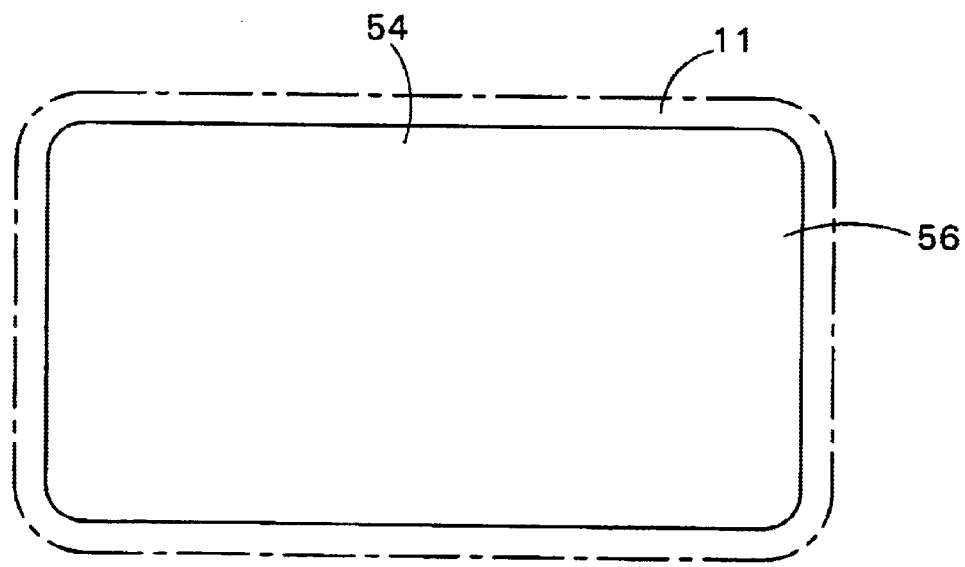
FIG. 16 is a plan view of a top view of an embodiment of an inner plastic portion for a table.

FIG. 16 depicts the first or inner plastic portion 54 in accordance with the present invention for forming a table when overmolded. The inner plastic portion 54 includes a plastic table top 56 with a fin structure 11 extending around the perimeter for forming a thickened peripheral rim when the second or outer plastic portion is molded thereover. In situations where a non-plastic table top is desired, such as glass, the inner plastic portion 54 is a peripheral ring surrounding an opening for receiving the glass top. Although the inner plastic portion 54 is depicted to be rectangular, alternatively, other suitable shapes can be employed, for example, round, oval etc.

Typically, the various embodiments of the present invention are manufactured in a two step injection molding process such as that previously described. The second or outer plastic portion is molded over at least the fin structure of the first or inner plastic portion to form a thickened protuberance. In some embodiments, the inner plastic portion is completely clad with the outer plastic portion. Alternatively, the first or inner portion can be formed in a different machine or operation prior to molding the second or outer portion thereover. Consequently in such a case, the first or inner portion can be made of plastics that are not of the injection molding type, or can be made of materials other than plastics such as metals, composites, etc. Alternatively, the second or outer portion can be molded over the first or inner portion by means other than injection molding. In some situations, it may be desirable to form an outer portion first and then mold an inner portion on the inside of the outer portion. In addition, in some embodiments, the first or inner plastic portion can be merely the fin structure, whereby the second or outer plastic portion also forms the body or structure of the plastic article as well as combining with the fin structure to form the thickened protuberance.

While this invention has been particularly shown and described with references to preferred embodiments thereof, it will be understood by those skilled in the art that various changes in form and details may be made therein without departing from the scope of the invention encompassed by the appended claims.

For example, various features of the embodiments described above can be omitted or combined with each other. The plastic articles of the present invention can have combinations of different shapes, for example, round or curved portions and rectangular or polygonal portions. In addition, although terms such as horizontal, vertical, bottom, upwardly, etc. have been employed in the Specification, such terms are employed for describing the various embodiments and are not meant to limit the orientations thereof. Furthermore, although various embodiments of the present invention have been described as flower pots, containers, furniture members etc., the present invention is not limited to lawn, patio and garden items, but can be employed in any technology and for any purpose. It is understood that a flower pot can be employed for containing flowers, plants, trees, shrubs, dried or artificial items, etc. The fin structure 11 typically includes a series of fins but in some embodiments may have only one fin. In some instances where the thickened rim is relatively small, the fins can be omitted and the thickened rim formed in two molding processes where a portion of the thickened rim is formed in each molding process, each portion being small enough to have a sufficient cooling speed.

What is claimed is:

1. A plastic article, being a container in the form of a flower pot, comprising:
   a first plastic portion having a series of protrusions extending therefrom and adjacent to each other, the protrusions being fins with a zigzag pattern; and
   a second plastic portion molded between and over the protrusions of the first plastic portion, thereby forming a projecting protuberance on the plastic article having a desired profile, at least some of the protrusions extending into locations of the protuberance that are projected from the plastic article, the protrusions extending from the first plastic portion being contoured to provide a general approximation of the desired profile of the protuberance, the first plastic portion being an inner container portion and the second plastic portion being an outer container portion molded over the inner container portion, the protuberance forming an upper rim of the container.

2. The article of claim 1 in which the protrusions each have a height and a thickness, the height being greater than the thickness.

3. The article of claim 1 in which the inner container portion includes an inner pattern formed thereon for supporting a corresponding outer pattern on the outer container portion.

4. The article of claim 1 in which the inner container portion has a fluted side wall.

5. The article of claim 1 in which the protuberance is unitary and thickened.

6. A method of forming a plastic article, being a container in the form of a flower pot, comprising:
   providing a first plastic portion having a series of protrusions extending therefrom and adjacent to each other, the protrusions being fins with a zigzag pattern, the first plastic portion being formed by injection molding in a first mold configuration; and
   injection molding a second plastic portion between and over the protrusions of the first plastic portion to form a projecting protuberance on the plastic article of a desired profile, a least some of the protrusions extending into locations of the protuberance that are projected from the plastic article, the first plastic portion being an inner container portion and the second plastic portion being an outer container portion molded over the inner container portion, the protuberance being an upper rim of the container.

7. The method of claim 6 further comprising molding the second plastic portion over the first plastic portion in a second mold configuration.

8. The method of claim 7 further comprising providing the first plastic portion with mineral fillers for reducing cooling time of the first plastic portion.

9. The method of claim 6 further comprising contouring the protrusions to provide a general approximation of the desired profile of the protuberance.

10. The method of claim 9 further comprising forming each protrusion with a height and thickness, the height being greater than the thickness.

11. The method of claim 6 further comprising forming an inner pattern on the inner container portion for supporting a corresponding outer pattern on the outer container portion.

12. The method of claim 6 further comprising forming the inner container portion with a fluted side wall.

13. The method of claim 6 further comprising forming a unitary thickened protuberance.

* * * * *